(12) United States Patent
Varanasi

(10) Patent No.: US 8,994,851 B2
(45) Date of Patent: Mar. 31, 2015

(54) DISPLAYING IMAGE DATA AND GEOGRAPHIC ELEMENT DATA

(75) Inventor: Anantakrishna Varanasi, Union City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 150 days.

(21) Appl. No.: 11/890,794

(22) Filed: Aug. 7, 2007

(65) Prior Publication Data

US 2009/0040370 A1 Feb. 12, 2009

(51) Int. Cl.
*G01C 21/00* (2006.01)
*G06T 19/00* (2011.01)
*H04N 5/232* (2006.01)
*H04M 1/02* (2006.01)
*G01C 21/20* (2006.01)

(52) U.S. Cl.
CPC .............. *G01C 21/20* (2013.01); *G06T 19/006* (2013.01); *H04N 5/23293* (2013.01); *H04M 1/0264* (2013.01)
USPC ...................................................... 348/231.3

(58) Field of Classification Search
USPC .................................. 348/333.02; 455/556.1
See application file for complete search history.

(56) References Cited

U.S. PATENT DOCUMENTS

| | | | |
|---|---|---|---|
| 5,508,736 A | 4/1996 | Cooper | |
| 5,742,521 A * | 4/1998 | Ellenby et al. | 702/127 |
| 5,787,233 A | 7/1998 | Akimoto | |
| 5,815,411 A * | 9/1998 | Ellenby et al. | 702/150 |
| 5,838,262 A | 11/1998 | Kershner et al. | |
| 6,037,936 A | 3/2000 | Ellenby et al. | |
| 6,141,014 A | 10/2000 | Endo et al. | |
| 6,222,583 B1 * | 4/2001 | Matsumura et al. | 348/113 |
| 6,307,556 B1 * | 10/2001 | Ellenby et al. | 345/427 |
| 6,396,475 B1 * | 5/2002 | Ellenby et al. | 345/156 |
| 6,414,696 B1 * | 7/2002 | Ellenby et al. | 715/762 |
| 6,490,521 B2 | 12/2002 | Wiener | |
| 6,577,249 B1 | 6/2003 | Akatsuka et al. | |
| 6,963,800 B1 | 11/2005 | Milbert | |

(Continued)

FOREIGN PATENT DOCUMENTS

| | | |
|---|---|---|
| CN | 101379369 A | 3/2009 |
| DE | 10 2005 013 541 A1 | 9/2006 |

(Continued)

OTHER PUBLICATIONS

International Search Report and Written Opinion for International Application No. PCT/US2008/071324, mail date Oct. 22, 2008, 7 pages.

(Continued)

*Primary Examiner* — Justin P Misleh
(74) *Attorney, Agent, or Firm* — Mahamedi Paradice LLP

(57) ABSTRACT

A mobile computing device includes a housing, a camera, a display, a memory, and a processing circuit. The housing is configured to be carried by a user while in use. The camera is configured to output image data. The memory is configured to store geographic element data representing one or more geographic elements. The processing circuit is configured to receive the geographic element data for the plurality of geographic elements. The processing circuit is configured to determine a camera orientation. The processing circuit is configured to concurrently display the image data and geographic element data for the plurality of geographic elements on the display.

17 Claims, 6 Drawing Sheets

(56) References Cited

U.S. PATENT DOCUMENTS

| | | | |
|---|---|---|---|
| 7,027,823 B2* | 4/2006 | Mikuni | 455/457 |
| 7,088,389 B2* | 8/2006 | Shibasaki et al. | 348/239 |
| 7,136,093 B1* | 11/2006 | Itoh et al. | 348/207.11 |
| 7,385,643 B2* | 6/2008 | Muramatsu | 348/373 |
| 7,453,491 B2* | 11/2008 | Kinjo | 348/118 |
| 7,460,953 B2* | 12/2008 | Herbst et al. | 701/211 |
| 7,490,294 B2* | 2/2009 | Okada | 715/762 |
| 7,545,415 B2* | 6/2009 | Azuma et al. | 348/231.3 |
| 2001/0015759 A1* | 8/2001 | Squibbs | 348/232 |
| 2001/0040629 A1* | 11/2001 | Miyagi et al. | 348/232 |
| 2001/0055373 A1* | 12/2001 | Yamashita | 379/90.01 |
| 2002/0001032 A1* | 1/2002 | Ohki | 348/207 |
| 2002/0011951 A1* | 1/2002 | Pepin et al. | 342/357.13 |
| 2002/0039138 A1* | 4/2002 | Edelson et al. | 348/208 |
| 2002/0075282 A1* | 6/2002 | Vetterli et al. | 345/632 |
| 2002/0075323 A1* | 6/2002 | O'Dell | 345/835 |
| 2002/0091793 A1* | 7/2002 | Sagie | 709/217 |
| 2002/0191862 A1 | 12/2002 | Neumann et al. | |
| 2003/0027553 A1 | 2/2003 | Davidson et al. | |
| 2003/0164822 A1* | 9/2003 | Okada | 345/204 |
| 2004/0239688 A1* | 12/2004 | Krajec | 345/629 |
| 2005/0157173 A1* | 7/2005 | Kurebayashi et al. | 348/207.11 |
| 2006/0004512 A1* | 1/2006 | Herbst et al. | 701/208 |
| 2006/0136129 A1 | 6/2006 | Yokozawa | |
| 2006/0155466 A1 | 7/2006 | Kanda et al. | |
| 2006/0181510 A1 | 8/2006 | Faith | |
| 2006/0190812 A1* | 8/2006 | Ellenby et al. | 715/512 |
| 2006/0227211 A1* | 10/2006 | Kotake et al. | 348/141 |
| 2007/0088497 A1* | 4/2007 | Jung | 701/207 |
| 2007/0110338 A1* | 5/2007 | Snavely et al. | 382/305 |
| 2007/0162942 A1* | 7/2007 | Hamynen et al. | 725/105 |
| 2007/0268392 A1* | 11/2007 | Paalasmaa et al. | 348/333.02 |
| 2008/0134030 A1* | 6/2008 | Kansal et al. | 715/700 |
| 2008/0254811 A1* | 10/2008 | Stewart | 455/456.2 |
| 2008/0267504 A1 | 10/2008 | Schloter et al. | |
| 2009/0002394 A1 | 1/2009 | Chen et al. | |
| 2009/0043504 A1 | 2/2009 | Bandyopadhyay et al. | |
| 2010/0035637 A1 | 2/2010 | Varanasi et al. | |

FOREIGN PATENT DOCUMENTS

| | | |
|---|---|---|
| EP | 0867690 A1 | 9/1998 |
| EP | 1246080 A2 | 10/2002 |
| EP | 1622081 A1 | 2/2006 |
| EP | 1734341 A1 | 12/2006 |
| WO | WO-2005124594 A1 | 12/2005 |
| WO | WO-2007080473 A1 | 7/2007 |
| WO | WO-2008076526 A1 | 6/2008 |
| WO | WO-2008138670 A1 | 11/2008 |

OTHER PUBLICATIONS

Jay David Bolter and Blair MacIntyre, Is It Live or Is It AR?, IEEE Spectrum, Aug. 2007, pp. 30-35.

Stein, Augmented reality: iPhone 3G S killer app?, printed from Internet address: http://news.cnet.com/8301-17938_105-10266380-1.html on Dec. 9, 2009, 3 pages.

Office Action for U.S. Appl. No. 12/535,841, mail date May 13, 2010, 15 pages.

Office Action for U.S. Appl. No. 12/535,841, mail date Oct. 19, 2010, 13 pages.

IPRP including Written Opinion of the International Searching Authority, mailed Feb. 16, 2012 ; issued in related PCT Application No. PCT/US2010/042743.

Supplementary European Search Report—EP08796699—Search Authority—The Hague—Apr. 4, 2012.

Harte L., "Introduction to MPEG—MPEG-1, MPEG-2 and MPEG-4", excerpted from "IPTV Basics", Althos Publishing, Inc., 2006, p. 24.

* cited by examiner

DISPLAYING IMAGE DATA AND GEOGRAPHIC ELEMENT DATA

BACKGROUND

Cameras may be used with mobile computing devices of many types. Some mobile computing devices are also capable of displaying navigational data. Positioning devices may also be used with mobile computing devices to determine the position of the device and to display nearby points of interest.

DETAILED DESCRIPTION OF EXEMPLARY EMBODIMENTS

There is a need for an improved system and method for displaying geographic elements on a display of a computing device, such as a mobile computing device. Further, there is a need for a system and method which display geographic elements based at least in part on orientation of the device and/or a direction in which the user of the device is facing. Further still, there is a need for a system and method which display geographic elements based at least in part on updated or instantaneous orientation data as a user of the device changes the direction the user or device is facing. Further still, there is a need for a system and method configured to enable a user to point a mobile computing device at a location or geographic element and get information about the geographic element (e.g., street name, landmark, etc.).

Figure 1:
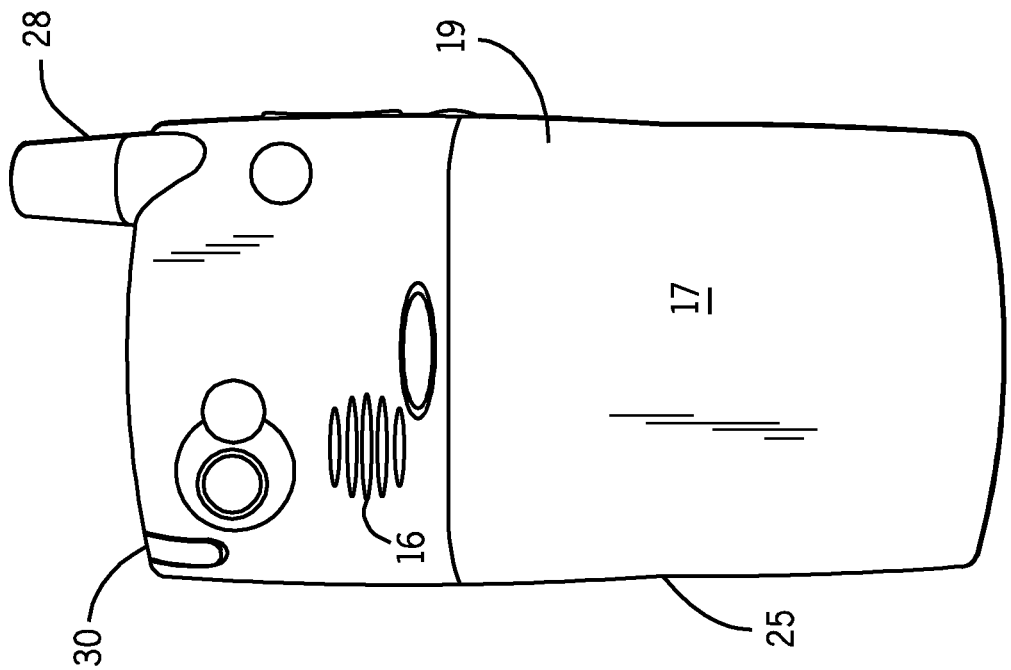
FIG. 1 is a front view of a mobile computing device, according to an exemplary embodiment.

Referring first to FIG. 1, a mobile computing device 100 is shown. Device 100 is a smart phone, which is a combination mobile telephone and handheld computer having personal digital assistant functionality. The teachings herein can be applied to other mobile computing devices (e.g., a laptop computer, digital camera, camera phone, personal navigation device, etc.) which may be configured to be carried by a user while in use or other electronic devices (e.g., a desktop personal computer, etc.). Personal digital assistant functionality can comprise one or more of personal information management functions (e.g., e-mail, calendar, contacts/address book, notes, bookmarks, favorites, etc.), database functions, word processing, spreadsheets, voice memo recording, etc. and may be configured to synchronize personal information from one or more applications with a computer (e.g., desktop, laptop, remote networked server, etc.). Device 100 may comprise a general purpose microprocessor which is further configured to receive and operate additional applications provided to device 100 after manufacture, e.g., via wired or wireless download, SecureDigital card, etc.

Figure 2:
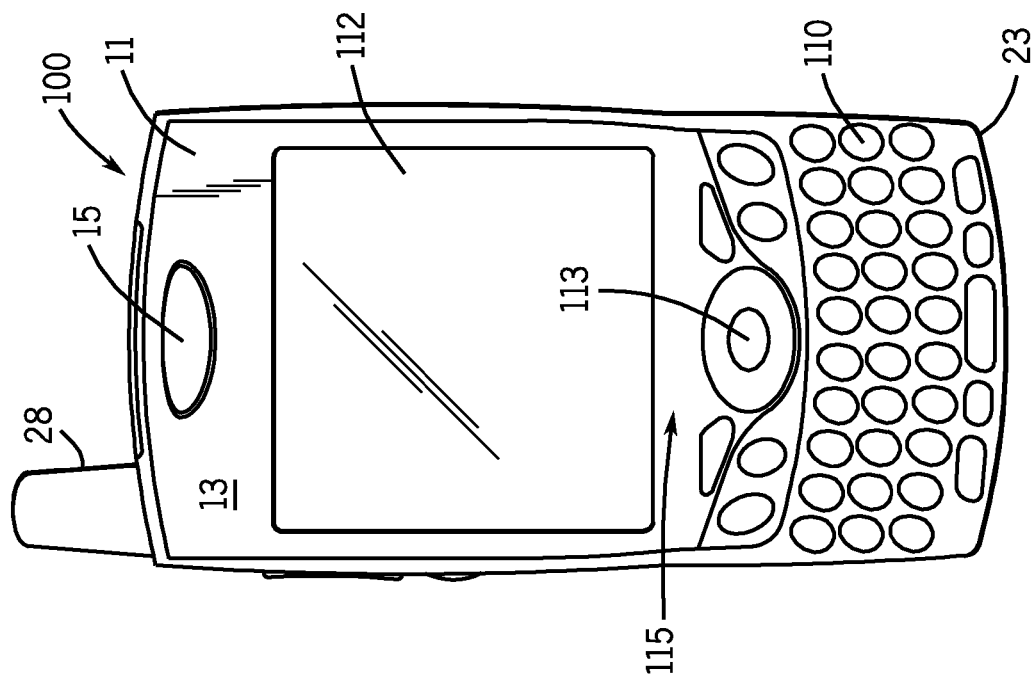
FIG. 2 is a back view of a mobile computing device, according to an exemplary embodiment.

Device 100 comprises a housing 11 having a front side 13 and a back side 17 (FIG. 2). An earpiece speaker 15, a loudspeaker 16, and a user input device are coupled to housing 11. Housing 11 is configured to hold a screen in a fixed or slidable relationship above a user input device in a substantially parallel or same plane as the user input device. This fixed or slidable relationship excludes a hinged relationship between the screen and plurality of keys. Device 100 may be a handheld computer, which is a computer small enough to be carried in a typical front pocket found in a pair of pants, comprising such devices as typical mobile telephones, personal digital assistants, and some digital cameras, but excluding typical laptop computers, tablet PCs, and larger digital cameras. In alternative embodiments, display 112, user input device 110, earpiece 15 and loudspeaker 16 may each be positioned anywhere on front side 13, back side 17 or the edges therebetween.

In various embodiments device 100 has a width (shorter dimension) of no more than about 200 mm or no more than about 100 mm. According to some of these embodiments, housing 11 has a width of no more than about 85 mm or no more than about 65 mm. According to some embodiments, housing 11 has a width of at least about 30 mm or at least about 50 mm. According to some of these embodiments, housing 11 has a width of at least about 55 mm.

In some embodiments, housing 11 has a length (longer dimension) of no more than about 200 mm or no more than about 150 mm. According to some of these embodiments, housing 11 has a length of no more than about 135 mm or no more than about 125 mm. According to some embodiments, housing 11 has a length of at least about 70 mm or at least about 100 mm. According to some of these embodiments, housing 11 has a length of at least about 110 mm.

In some embodiments, housing 11 has a thickness (smallest dimension) of no more than about 150 mm or no more than about 50 mm. According to some of these embodiments, housing 11 has a thickness of no more than about 30 mm or no more than about 25 mm. According to some embodiments, housing 11 has a thickness of at least about 10 mm or at least about 15 mm. According to some of these embodiments, housing 11 has a thickness of at least about 50 mm.

In some embodiments, housing 11 has a volume of up to about 2500 cubic centimeters and/or up to about 1500 cubic centimeters. In some of these embodiments, housing 11 has a volume of up to about 1000 cubic centimeters and/or up to about 600 cubic centimeters.

While described with regards to a hand-held device, many embodiments are usable with portable devices which are not handheld and/or with non-portable devices/systems.

Device 100 may provide voice communications functionality in accordance with different types of cellular radiotelephone systems. Examples of cellular radiotelephone systems may include Code Division Multiple Access (CDMA) cellular radiotelephone communication systems, Global System for Mobile Communications (GSM) cellular radiotelephone systems, etc.

In addition to voice communications functionality, device 100 may be configured to provide data communications functionality in accordance with different types of cellular radiotelephone systems. Examples of cellular radiotelephone systems offering data communications services may include GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, etc.

Device 100 may be configured to provide voice and/or data communications functionality in accordance with different types of wireless network systems. Examples of wireless network systems may further include a wireless local area network (WLAN) system, wireless metropolitan area network (WMAN) system, wireless wide area network (WWAN) system, and so forth. Examples of suitable wireless network systems offering data communication services may include the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, a wireless personal area network (PAN) system, such as a Bluetooth system operating in accordance with the Bluetooth Special Interest Group (SIG) series of protocols.

Figure 3:
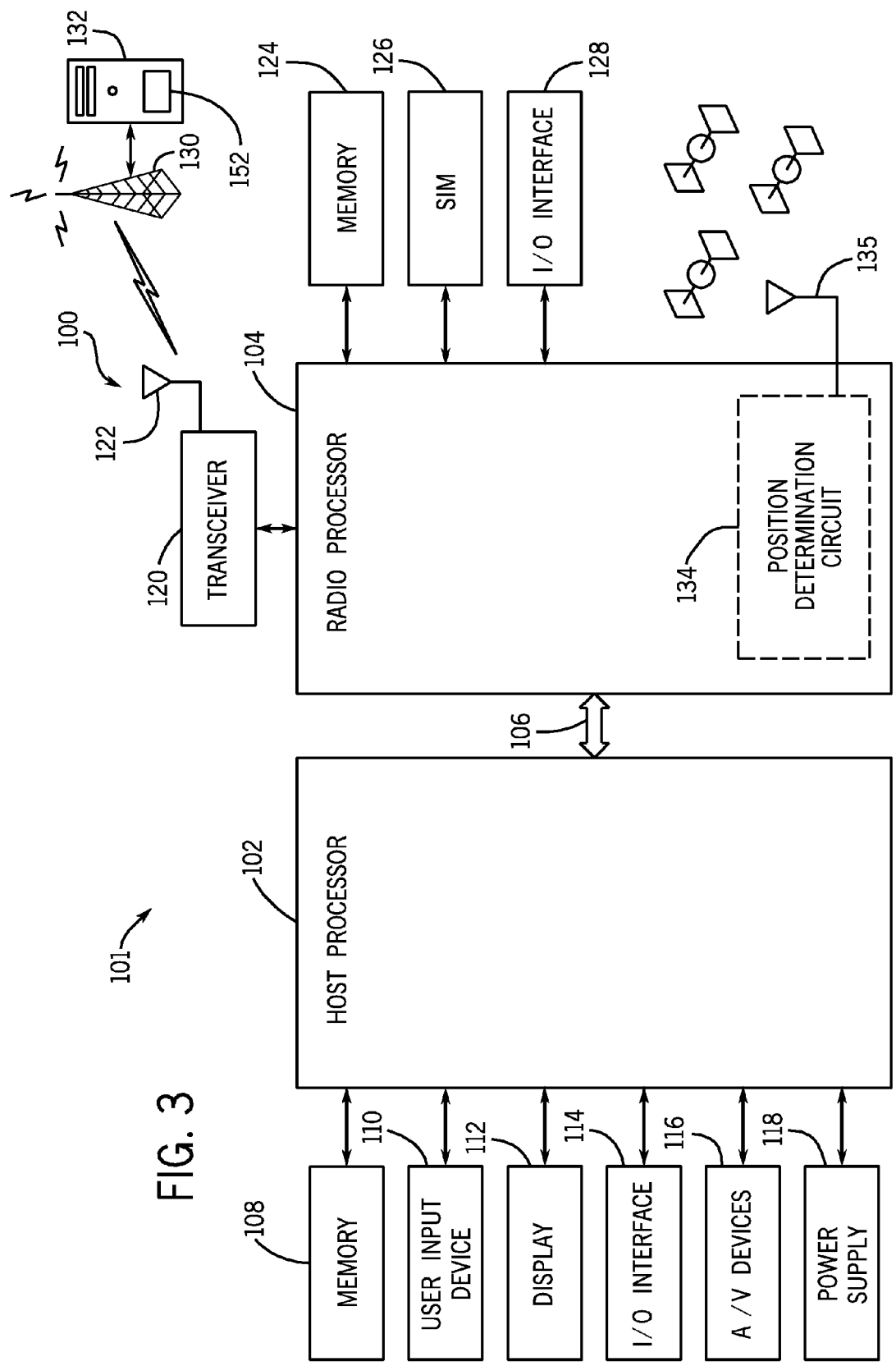
FIG. 3 is a block diagram of the mobile computing device of FIGS. 1 and 2, according to an exemplary embodiment.

As shown in the embodiment of FIG. 3, device 100 may comprise a processing circuit 101 which may comprise a dual processor architecture including a host processor 102 and a radio processor 104 (e.g., a base band processor). The host processor 102 and the radio processor 104 may be configured to communicate with each other using interfaces 106 such as one or more universal serial bus (USB) interfaces, micro-USB interfaces, universal asynchronous receiver-transmitter (UART) interfaces, general purpose input/output (GPIO) interfaces, control/status lines, control/data lines, shared memory, and so forth.

The host processor 102 may be responsible for executing various software programs such as application programs and system programs to provide computing and processing operations for device 100. The radio processor 104 may be responsible for performing various voice and data communications operations for device 100 such as transmitting and receiving voice and data information over one or more wireless communications channels. Although embodiments of the dual processor architecture may be described as comprising the host processor 102 and the radio processor 104 for purposes of illustration, the dual processor architecture of device 100 may comprise additional processors, may be implemented as a dual- or multi-core chip with both host processor 102 and radio processor 104 on a single chip, etc. Alternatively, processing circuit 101 may comprise any digital and/or analog circuit elements, comprising discrete and/or solid state components, suitable for use with the embodiments disclosed herein.

In various embodiments, the host processor 102 may be implemented as a host central processing unit (CPU) using any suitable processor or logic device, such as a general purpose processor. The host processor 102 may comprise, or be implemented as, a chip multiprocessor (CMP), dedicated processor, embedded processor, media processor, input/output (I/O) processor, co-processor, a field programmable gate array (FPGA), a programmable logic device (PLD), or other processing device in alternative embodiments.

The host processor 102 may be configured to provide processing or computing resources to device 100. For example, the host processor 102 may be responsible for executing various software programs such as application programs and system programs to provide computing and processing operations for device 100. Examples of application programs may include, for example, a telephone application, voicemail application, e-mail application, instant message (IM) application, short message service (SMS) application, multimedia message service (MMS) application, web browser application, personal information manager (PIM) application, contact management application, calendar application, scheduling application, task management application, word processing application, spreadsheet application, database application, video player application, audio player application, multimedia player application, digital camera application, video camera application, media management application, a gaming application, and so forth. The application software may provide a graphical user interface (GUI) to communicate information between device 100 and a user.

System programs assist in the running of a computer system. System programs may be directly responsible for controlling, integrating, and managing the individual hardware components of the computer system. Examples of system programs may include, for example, an operating system (OS), device drivers, programming tools, utility programs, software libraries, an application programming interface (API), graphical user interface (GUI), and so forth. Device 100 may utilize any suitable OS in accordance with the described embodiments such as a Palm OS®, Palm OS® Cobalt, Microsoft® Windows OS, Microsoft Windows® CE, Microsoft Pocket PC, Microsoft Mobile, Symbian OS™, Embedix OS, Linux, Binary Run-time Environment for Wireless (BREW) OS, JavaOS, a Wireless Application Protocol (WAP) OS, and so forth.

Device 100 may comprise a memory 108 coupled to the host processor 102 and a memory 124 coupled to radio processor 104. Device 100 may be configured to wirelessly access a memory 152 coupled to a remote computer 132. In various embodiments, the memory 108, 124 may be configured to store one or more software programs to be executed by the host processor 102 or radio processor 104. Memories 108, 124, 152 may be implemented using any machine-readable or computer-readable media capable of storing data such as volatile memory or non-volatile memory, removable or non-removable memory, erasable or non-erasable memory, writeable or re-writeable memory, and so forth. Examples of machine-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), or any other type of media suitable for storing information.

Although memory 108, 124 may be shown as being separate from the host processor 102 and radio processor 104 for purposes of illustration, in various embodiments some portion or the entire memory 108 may be included on the same integrated circuit as the host processor 102. Alternatively, some portion or the entire memory 108, 124 may be disposed on an integrated circuit or other medium (e.g., hard disk drive) external to the integrated circuit of host processor 102. In various embodiments, device 100 may comprise an expansion slot to support a multimedia and/or memory card, for example, and memory 108, 124 may be a removable memory device.

Device 100 may comprise a user input device 110 coupled to the host processor 102. The user input device 110 may comprise, for example, a QWERTY key layout and an integrated number dial pad. Device 100 also may comprise various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, a keypad, an alphanumeric keypad, a touch screen, a touch pad, a speech or voice recognition device, and so forth.

The host processor 102 may be coupled to a display 112. The display 112 may comprise any suitable visual interface for displaying content to a user of device 100. For example, the display 112 may be implemented by a liquid crystal display (LCD) such as a touch-sensitive color (e.g., 16-bit color) thin-film transistor (TFT) LCD screen. In some embodiments, the touch-sensitive LCD may be used with a stylus and/or a handwriting recognizer program.

Device 100 may comprise an input/output (I/O) interface 114 coupled to the host processor 102 and a I/O interface 128 coupled to the radio processor. I/O interfaces 114, 128 may comprise one or more I/O devices such as a serial connection port, an infrared port, integrated Bluetooth® wireless capability, and/or integrated 802.11x (WiFi) wireless capability, to enable wired (e.g., USB cable) and/or wireless connection to a local computer system, such as a local personal computer (PC). In various implementations, device 100 may be configured to transfer and/or synchronize information with the local computer system.

The host processor 102 may be coupled to various audio/video (A/V) devices 116 that support A/V capability of device 100. Examples of A/V devices 116 may include, for example, a microphone, one or more speakers, an audio port to connect an audio headset, an audio coder/decoder (codec), an audio player, a digital camera, a video camera, a video codec, a video player, and so forth.

The host processor 102 may be coupled to a power supply 118 configured to supply and manage power to the elements of device 100. In various embodiments, the power supply 118 may be implemented by a rechargeable battery, such as a removable and rechargeable lithium ion battery to provide direct current (DC) power, and/or an alternating current (AC) adapter to draw power from a standard AC main power supply.

Device 100 may comprise a transceiver 120 coupled to the radio processor 104. The transceiver 120 may comprise one or more transceivers configured to communicate using different types of protocols, communication ranges, operating power requirements, RF sub-bands, information types (e.g., voice or data), use scenarios, applications, and so forth.

The transceiver 120 may be implemented using one or more chips as desired for a given implementation. Although the transceiver 120 may be shown as being separate from and external to the radio processor 104 for purposes of illustration, in various embodiments some portion or the entire transceiver 120 may be included on the same integrated circuit as the radio processor 104.

Device 100 may comprise an antenna system 122 for transmitting and/or receiving electrical signals. As shown, the antenna system 122 may be coupled to the radio processor 104 through the transceiver 120. The antenna system 122 may comprise or be implemented as one or more internal antennas and/or external antennas.

Device 100 may comprise a subscriber identity module (SIM) 126 coupled to the radio processor 104. The SIM 126 may comprise, for example, a removable or non-removable smart card configured to encrypt voice and data transmissions and to store user-specific data for allowing a voice or data communications network to identify and authenticate the user. The SIM 126 also may store data such as personal settings specific to the user.

In various embodiments, device 100 may comprise location or position determination capabilities. Device 100 may employ one or more location determination techniques including, for example, Global Positioning System (GPS) techniques, Cell Global Identity (CGI) techniques, CGI including timing advance (TA) techniques, Enhanced Forward Link Trilateration (EFLT) techniques, Time Difference of Arrival (TDOA) techniques, Angle of Arrival (AOA) techniques, Advanced Forward Link Trilateration (AFTL) techniques, Observed Time Difference of Arrival (OTDOA), Enhanced Observed Time Difference (EOTD) techniques, Assisted GPS (AGPS) techniques, hybrid techniques (e.g., GPS/CGI, AGPS/CGI, GPS/AFTL or AGPS/AFTL for CDMA networks, GPS/EOTD or AGPS/EOTD for GSM/GPRS networks, GPS/OTDOA or AGPS/OTDOA for UMTS networks), etc.

Device 100 may be configured to receive location data and associate the location data with a digital image captured by device 100 or for use with other applications, such as navigation applications. Device 100 may comprise a local position determination circuit 134 (e.g., a GPS receiver) which may be integrated within housing 11 (FIG. 1) configured to receive satellite data via an antenna 135 and to calculate a position fix. Local position determination circuit may alternatively comprise a GPS receiver in a second housing separate from housing 11 but in the vicinity of device 100 and configured to communicate with device 100 wirelessly (e.g., via a PAN, such as Bluetooth). Device 100 may be configured to communicate over a radio access network 130 (e.g., UMTS radio access network) with the remote computer 132 (e.g., a location determination entity (PDE), a location proxy server (LPS) and/or a mobile positioning center (MPC), etc.).

When assisting the mobile computing device 100, the remote computer 132 may handle various processing operations and also may provide information to aid location determination. Examples of position assist data may include satellite-based measurements, terrestrial-based measurements, and/or system-based measurements such as satellite almanac information, GPS code phase measurements, ionospheric data, ephemeris data, time correction information, altitude estimates, timing offsets, forward/reverse link calibration, coarse data, and so forth.

The host processor 102 may comprise and/or implement at least one LBS (location-based service) application. In general, the LBS application may comprise any type of client application executed by the host processor 102, such as a GPS application, configured to communicate location requests (e.g., requests for position fixes) and location responses. Examples of LBS applications include, without limitation, wireless 911 emergency services, roadside assistance, asset tracking, fleet management, friends and family locator services, dating services, and navigation services which may provide the user with maps, directions, routing, traffic updates, mass transit schedules, information regarding local points-of-interest (POI) such as restaurants, hotels, landmarks, and entertainment venues, and other types of LBS services in accordance with the described embodiments.

Figure 4:
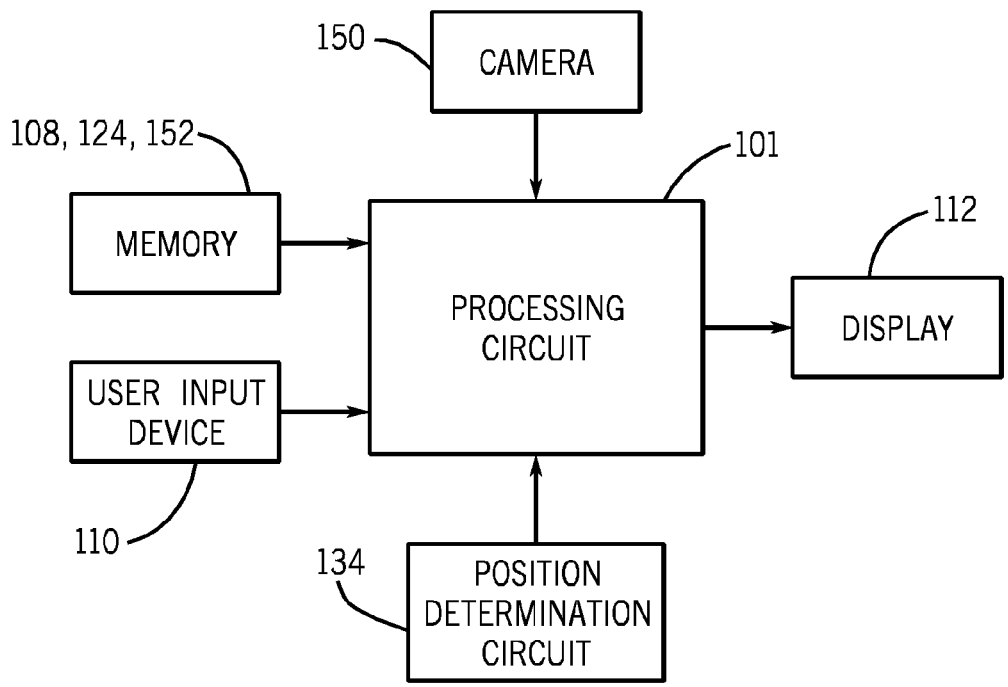
FIG. 4 is a block diagram of a system for displaying image data and geographic element data, according to an exemplary embodiment.

Referring now to FIG. 4, a system for displaying image data and geographic element data will be described. Some or all of the geographic element data may be stored on memory 108, 124 on device 100 and/or memory 152 located on remote computer 132 (FIG. 1). In embodiments wherein geographic element data is stored on memory 108, 124, some or all of the geographic element data may have been downloaded from memory 152 on remote computer 132. A camera 150 may be coupled (e.g., wired or wirelessly) to processing circuit 101, and is configured to output image data (photographic data of a person or thing, e.g., video data, digital still image data, etc.)

to processing circuit 101. Position determination circuit 134 and user input device 110 may also be coupled to processing circuit 101.

In this embodiment, memory 108, 124 or 152 may be configured to store geographic element data representing one or more geographic elements. Geographic elements may comprise buildings, streets, points of interest, waypoints, bodies of water, bridges, sculptures, monuments, parks, paths, other geographic elements, or other point locations that a user may find useful or interesting. Geographic elements may also comprise villages, towns, cities, counties, states, countries, the borders thereof, other geographic regions, etc. Geographic element data may comprise names, addresses, locations, latitudinal and longitudinal coordinates, size, depth, historical data, informational data such as hours of operation, population, other textual data, and other geographic element data.

Processing circuit 101 is configured to receive the geographic element data for the one or more geographic elements, to determine the orientation of camera 150, and to concurrently display the image data and geographic element data for the one or more geographic elements on display 112. The data types may be presented one after another (e.g., the image data followed by the geographic element data, the geographic element data followed by the image data, etc.) or at substantially the same time. The data types may be presented on a single software display screen, and may be presented substantially simultaneously. Geographic element data may be displayed in proximity to, on top of, aligned with, or adjacent to a geographic element shown in the image data.

In one embodiment, processing circuit 101 may be configured to determine or estimate the orientation or direction of camera 150 or device 100 at least in part via an image processing algorithm. The image processing algorithm may be configured to compare a first image to a second, subsequent image, to identify portions of the images representing a movement of an object in the image, and determine an orientation change of the camera based on the identified portions representing movement. An exemplary image processing algorithm is described below with reference to FIGS. 7 and 8.

In an alternative embodiment, processing circuit 101 may be configured to determine the orientation of camera 150 at least in part via position determination circuit 134. Processing circuit 101 may determine the orientation of camera 150 by using position determination circuit 134 to compare the device position at a first time with the device position at a second time. In another alternative embodiment, processing circuit 101 may determine the orientation of camera 150 at least in part via user input from user input device 110, wherein the user provides the orientation to device 100 (e.g., cardinal or intercardinal or other orientation data, facing a particular geographic element, etc.). A compass, gyroscope, or other directional indication device may alternatively provide the orientation of camera 150. In still other alternative embodiments, two or more of these systems for determining the orientation of camera 150 may be used in combination. For example, processing circuit 101 may determine the initial orientation of camera 150 via user input from user input device 110 or positional data from position determination circuit 134, and may determine any subsequent changes in the orientation of camera 150 via an image processing algorithm.

Processing circuit 101 may be configured to concurrently display the image data received from camera 150 and geographic element data received from memory 108, 124 or 152 on display 112. Processing circuit 101 may be configured to determine the geographic element data to display based in part on a field of view of camera 150, as indicated by the orientation data and/or current position data. Processing circuit 101 may be configured to display only geographic element data representing geographic elements within the field of view of camera 150. Alternatively, processing circuit 101 may be configured to display directional indicators representing the relative position of geographic elements not within the field of view of camera 150. Processing circuit 101 may determine whether a geographic element is within the field of view of camera 150 by comparing the orientation of camera 150 with position and size data for the geographic element.

In another embodiment, processing circuit 101 may be configured to select geographic element data based at least in part on device position data from position determination circuit 134. Processing circuit 101 may be configured to select geographic element data only for geographic elements within a set distance from the device position. In another embodiment, processing circuit 101 may be configured to select geographic element data only for geographic elements within a distance selected by a user via user input device 110.

In yet another embodiment, processing circuit 101 may be configured to display one or more geographic elements in a first mode, and in a second mode enable a user to select geographic element data for one or more of the geographic elements for display concurrently with the image data. In the second mode, a user may limit the geographic element data that is displayed by using user input device 110 to select geographic element data for one or more of the geographic elements. A user may select geographic element data using one or more possible selection methods, such as touching the one or more geographic elements on display 112 if display 112 is touch-sensitive, selecting geographic element data using a key pad or one or more buttons, selecting geographic element data using voice commands, and other selection methods. Processing circuit 101 may be configured to display geographic element data in the second mode only if it has been selected by a user. In one embodiment, a user may select whether to display the geographic element data in the first mode or the second mode.

In another embodiment, processing circuit 101 may be configured to display a distinguishing indicia which distinguishes at least one of the geographic elements from another of the geographic elements. The distinguishing indicia may be a geometric shape such as a rectangle or oval surrounding part or all of the geographic element, an alteration of color, contrast or brightness, an arrow or other directional indicator, a blinking indicator, or other distinguishing indicia. In one exemplary embodiment, processing circuit 101 may be configured to display distinguishing indicia for all geographic elements within the field of view of camera 150 for which geographic element data is available. In another exemplary embodiment, processing circuit 101 may be configured to display distinguishing indicia for one or more geographic elements based at least in part on the geographic element data (e.g., highlight all streets, all buildings, all geographic elements on a particular street, etc.). In yet another exemplary embodiment, processing circuit 101 may be configured to allow a user to select one or more geographic elements to distinguish with distinguishing indicia via user input device 110.

According to another exemplary embodiment, memory 108, 124, 152 may be configured to store geographic element data representing one or more geographic elements and processing circuit 101 may be configured to receive the geographic element data for the one or more geographic elements, determine the orientation of camera 150, and concurrently display image data received from camera 150 and geographic element data on display 112. In this embodiment, as the camera orientation changes, processing circuit 101 is configured to move the geographic element data on the display in at least two dimensions, such as for example the horizontal and vertical directions. The geographic element data in this embodiment may maintain a positional relationship with image data on the display as the camera orientation changes. Processing circuit 101 may accomplish this by assigning display coordinates to the geographic element data and updating the coordinates as the orientation of camera 150 changes. The geographic element data may comprise textual data. Processing circuit 101 may be configured to determine the orientation of camera 150 at least in part via an image processing algorithm. Processing circuit 101 may also be configured to select the geographic element data based at least in part on device position data provided by position determination circuit 134.

Figure 5:
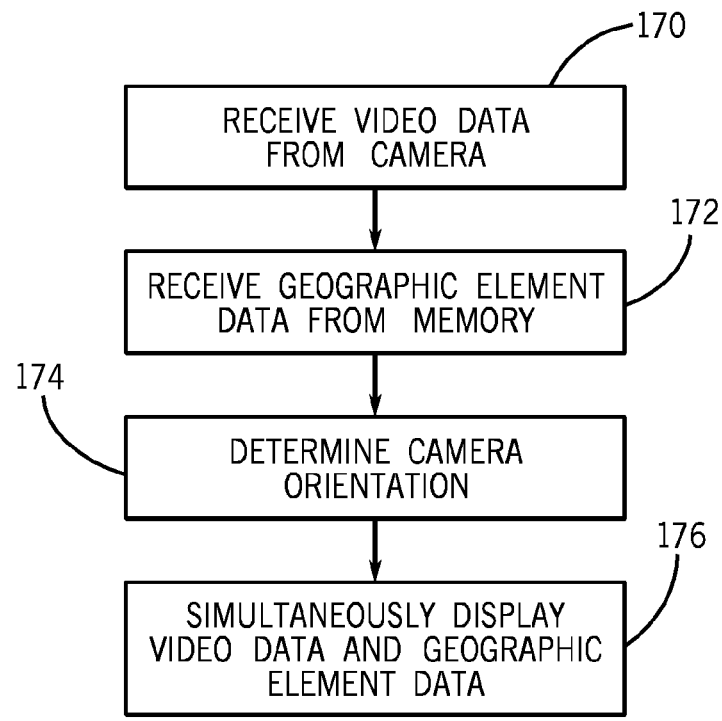
FIG. 5 is a flowchart illustrating a method for displaying image data and geographic element data, according to an exemplary embodiment.

Referring now to FIG. 5, an exemplary method of providing displaying image and geographic element data will be described. At step 170, the method comprises outputting image data from a camera and receiving the image data in a processing circuit of a mobile computing device. At step 172, the method comprises storing geographic element data representing geographic elements in a memory, and receiving the geographic element data from memory in the processing circuit. At step 174, the method comprises determining the orientation of the camera. At step 176, the method comprises concurrently displaying the image data and geographic element data on a display. For example, the method may comprise displaying image data and geographic element data for a certain building. The method may comprise receiving an image of the building from a camera, receiving the name and address of the building from a memory, determining the orientation of the camera, and concurrently displaying the image of the building and text representing the name and address of the building.

According to another exemplary embodiment, processing circuit 101 may be configured to receive an image from camera 150 and extract data from the image and save the extracted data as part of the geographic element data for a geographic element. Processing circuit 101 may extract data from the image using optical character recognition (OCR) or another method of data extraction from an image. In one embodiment, camera 150 may be used to capture an image of a street sign, billboard, or other signage and processing circuit 101 may extract the words from the image.

According to another exemplary embodiment, the image data from the camera may be displayed along with the geographic element data in real time. The camera may output image data, such as digital still images, a video camera feed or live video, or other images.

According to another exemplary embodiment, processing circuit 101 may be configured to superimpose navigational information or geographic elements data on a video camera display when a camera application operable on circuit 101 is enabled by the user or when a dedicated application is enabled by the user.

Figure 6:
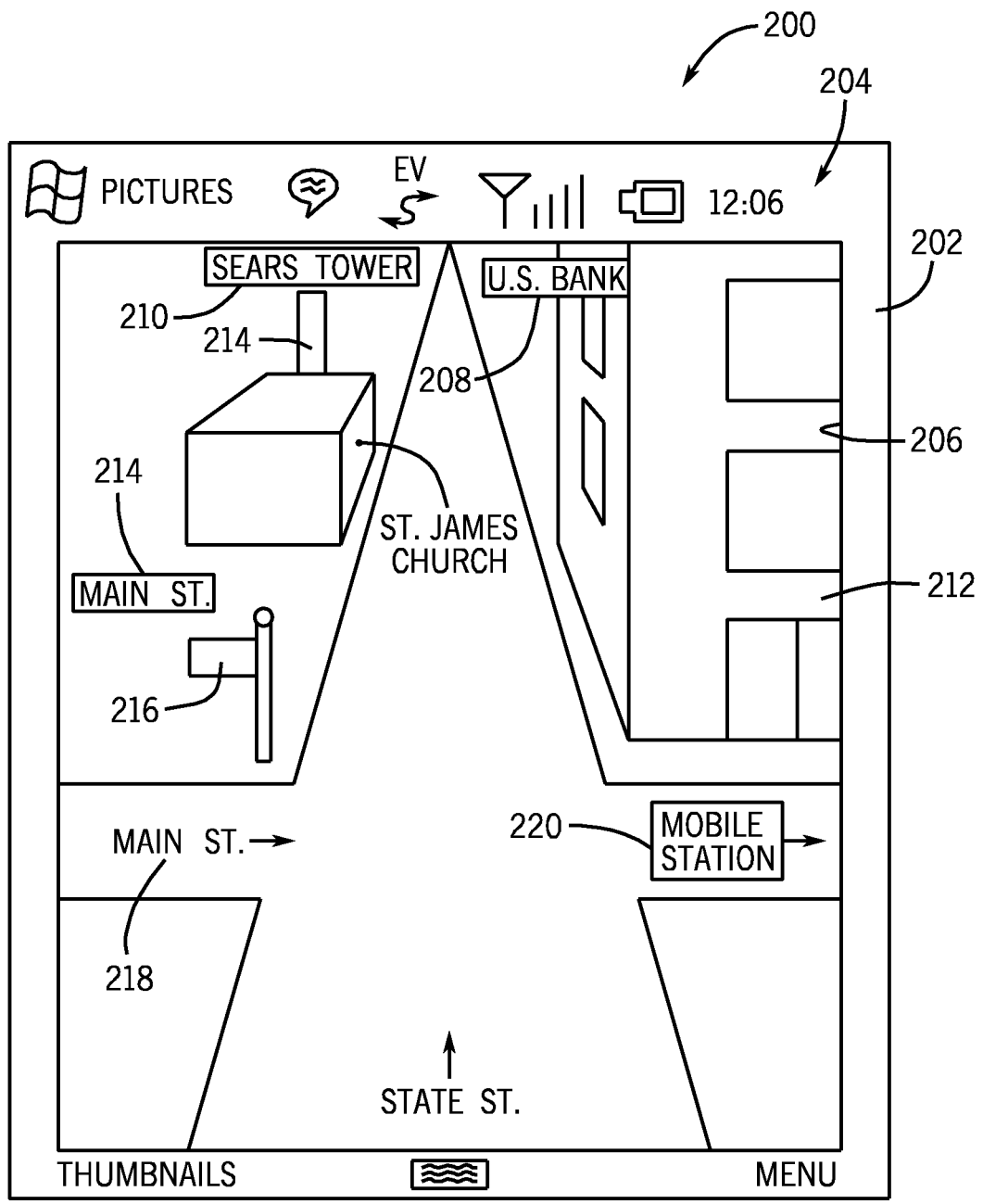
FIG. 6 is a schematic view of a mobile computing device, according to an exemplary embodiment.

Referring now to FIG. 6, a screen display is shown according to an exemplary embodiment. Screen display 200 comprises a border 202 illustrating a variety of icons 204 relating to wireless telephony, battery life, time of day, etc. In an image area 206 of screen display 200, an image from camera 150 is shown. In this exemplary embodiment, geographic element data is concurrently displayed with the image (e.g., overlayed, superimposed, etc.) in a few exemplary forms. Geographic element data for buildings are shown at indicia 208 (U.S. Bank) and 210 (Sears Tower). Indicia 208 comprises geographic element text data enclosed in a rectangular border disposed adjacent, overlapping, or near image data 212 associated with the U.S. Bank building. Indicia 210 comprises geographic element text data enclosed in an oval border disposed adjacent, overlapping, or near image data 214 associated with the Sears Tower building. The oval border can be indicative of a characteristic of the geographic element (e.g., the Sears Tower is some distance away, or disposed on or near a horizon line), or may be an alternative graphical way to display geographic text data. Indicia 214 shows street data (e.g. Main Street) which may be disposed on or near a street sign in the image data or on a street as shown at indicia 218. Alternatively, street sign 216 may be a graphical element generated by processing circuit 101 overlayed on the image data to show the name of the street. An indicia 220 is disposed in a proximate vertical location to illustrate a nearby geographic element (e.g., a Mobil gas station), along with an arrow indicating the direction of the nearby geographic element.

According to one exemplary embodiment, as the user changes the orientation of display 200, the image data and geographic element data (represented by the indicia) will move as well, and new image data and corresponding geographic element data may be presented on display screen 200.

According to another exemplary embodiment, the indicia may change in color or size to indicate proximity, point of interest, preselected destination, etc.

Figure 7:
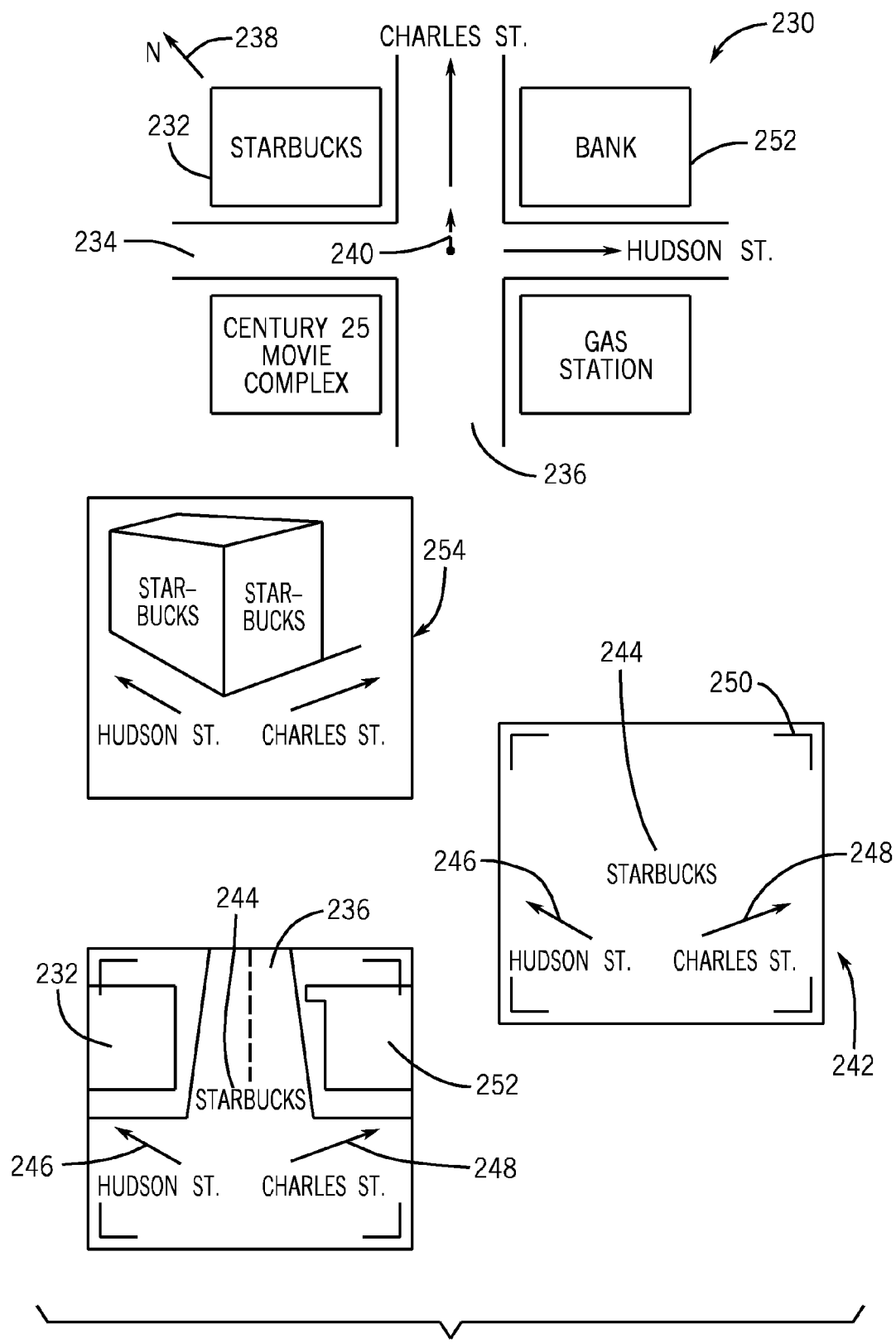
FIG. 7 is a graphic and three screens illustrating a system and method for displaying image data and geographic element data, according to an exemplary embodiment.

Referring now to FIG. 7, a system and method for displaying image data and geographic element data will be described, according to another exemplary embodiment. Graphic 230 is a schematic diagram of an exemplary geographic location having geographic elements comprising a building 232, a first street 234, and a second street 236. An arrow 238 indicates North and an X indicates a positions at which a user is using device 100. A dotted arrow 240 indicates an initial direction that a camera on device 100 is facing.

In this exemplary embodiment, displaying the image data and geographic element data comprises a first phase in which the camera is aligned. Alignment is performed initially when the application is switched on, every time device 100 loses alignment, or at other times. In a second phase, device 100 is configured to retrieve geographic element data and superpose the geographic element data on the image data from the camera. The second phase may be performed for every video frame generated by the camera.

In the camera alignment phase, an application running on processing circuit 101 will retrieve the current geographical position of device 100, retrieve a default orientation from memory (e.g., North), and superpose, superimpose, overlay, or display concurrently a camera image and the geographical element data which would be in the camera view if the camera is facing in the default orientation. Screen 242 illustrates a geographic element frame or image before alignment, which comprises geographic element data for a building 244 and two street geographic elements 246, 248, as well as optional edges 250 of the graphic element frame. Screen 244 illustrates the geographic element frame superposed on the camera image when the camera is facing the initial orientation or direction 240, before alignment. Elements 244, 246, 248 and 250 are superposed on the camera image, which shows a camera image of buildings 232 and 252, street 236, and surrounding geographic elements.

Next, the user may pan the camera and align the instantaneous video frame with the superposed geographical element data, until the screen appears as shown in screen 254. Processing circuit 101 may configure a button, soft key, or other shortcut key to receive an indication from the user as to when the video frame is aligned with the superposed geographic element data. For example, a center button 113 of a 5-way navigation system 115 may be the shortcut key. Processing circuit 101 may be configured to receive an indication from the user via the shortcut key to make the application determine that the video or camera frame is aligned to the geographical element data. The application will then proceed to the second phase.

During the geographical element retrieval and superposition phase, frames of motion vectors may be calculated continuously between successive video frames, as will be described below with reference to FIG. 8. Processing circuit 101 may be configured to apply these motion vectors to the current geographical element frame to estimate the new geographical element frame, and the geographical element data that should comprise the new geographical element frame. The new geographical element frame may be superimposed on the current video frame.

In case there is misalignment, for example when the current geographical element data and the current video frame do not match, the application may be configured to retrieve the north facing geographical element and the process may be repeated, which step may occur manually or automatically.

Figure 8:
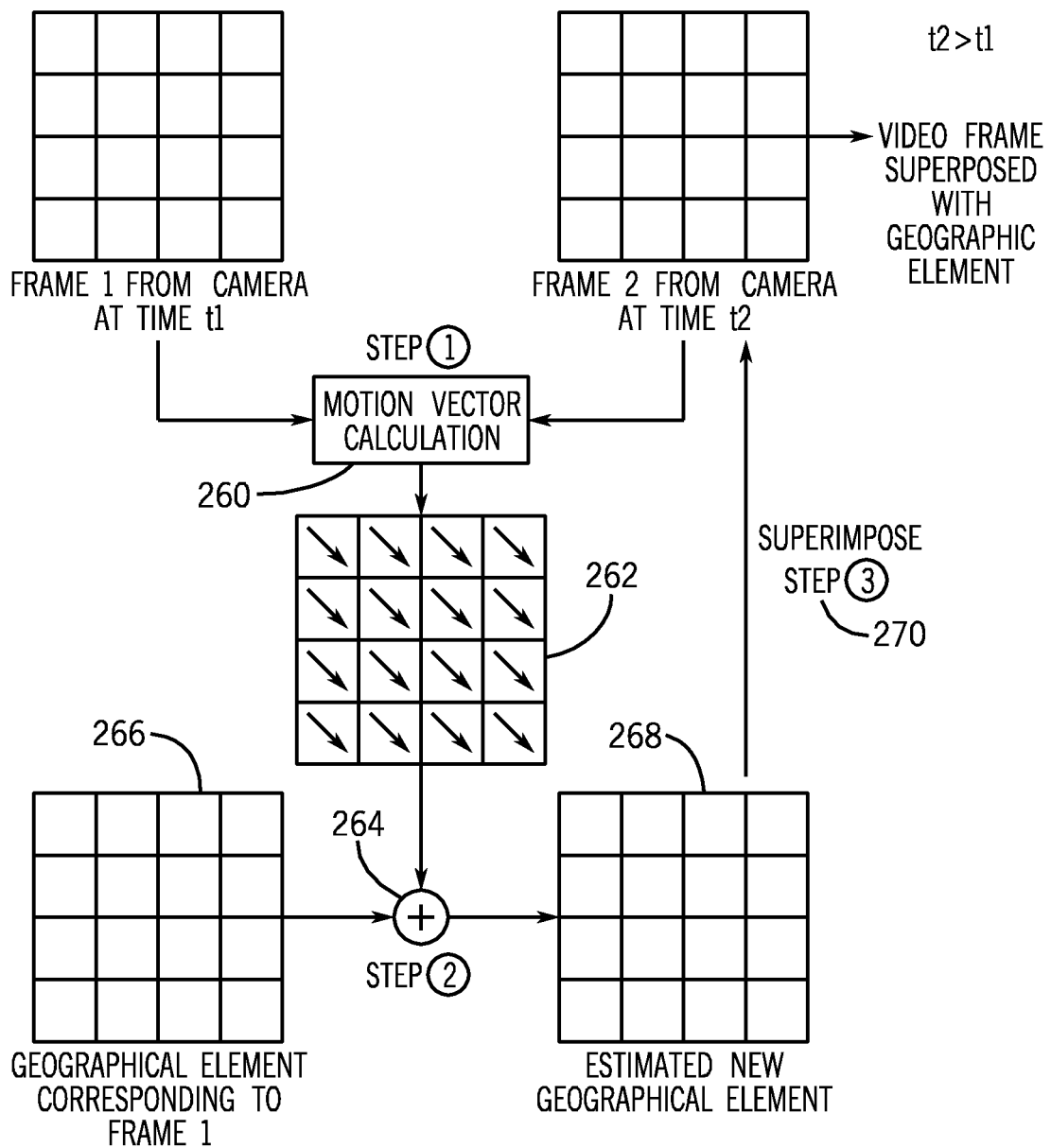
FIG. 8 is a flow diagram illustrating an image processing system and method, according to an exemplary embodiment.

FIG. 8 illustrates a flow diagram showing an exemplary image processing algorithm. The algorithm may be operable on processing circuit 101 during the second phase described above. At a step 260, video frames from the camera at times t1 and t2, which may be successive video frames or other video frames at different times, are partitioned into a plurality of macro blocks (e.g., 8 by 8, or other numbers) and compared. For each macro block from the old frame at t1, processing circuit 101 is configured to calculate a correlation with the 8 neighboring macro blocks in the new frame at t2. The neighboring block with highest correlation is recorded. Processing circuit 101 is then configured to calculate or determine a motion vector corresponding to the neighboring macro block with the highest correlation. The motion vector may be of the form (x,y) where x and y can take one of three values (−1, 0, 1). Hence, 8 possible motion vectors can be generated per macro block depending upon the direction of motion. Motion vectors are generated for the entire frame or at least a portion of the frame to provide the motion vector matrix 262. Alternatively, other methods may be used to calculate motion vector matrix 262 or to determine the orientation change of device 100.

At step 264, a new geographic element frame 268 is provided based on the first geographic element frame 266 and the motion vector matrix 262. Geographic element data is retrieved from memory as needed and reoriented or repositioned as needed to create new geographic element frame 268. New frame 268 is then superimposed at step 270 on new frame at t2. At step 272, the display screen of device 100 is updated with the video frame from the camera superimposed with the new geographic element frame 268.

With reference to the disclosure and claims, use of the phrase "based on" means "based in least in part on," and use of the term "a" or "an" means "one or more" or "at least one." Further, any of the steps of any of the methods disclosed herein may be combined with any of the other steps and/or rearranged with other steps in alternative embodiments. Specifically, various embodiments may make use of different combinations of parts or all of the methods disclosed herein.

While the exemplary embodiments illustrated in the FIGs., and described above are presently exemplary, it should be understood that these embodiments are offered by way of example only. For example, while exemplary embodiments are illustrated for use on a mobile computing devices, the teachings herein may extend to use in other fields, such as automobiles, aircraft, etc. Accordingly, the present invention is not limited to a particular embodiment, but extends to various modifications that nevertheless fall within the scope of the appended claims.

What is claimed is:

1. A mobile computing device comprising:
a camera to capture video data;
a display to output the video data;
a position determination circuit to determine a current position of the mobile computing device;
a processing circuit; and
one or more memory resources storing instructions that, when executed by the processing circuit, cause the mobile computing device to:
identify geographic elements in the video data;
based on the current position and an orientation of the camera, determine a field of view of the camera;
superimpose, on the video data, geographic indicators corresponding to the geographic elements; and
reposition the geographical indicators on the video data based on a change in the field of view of the camera by:
partitioning each frame of the video data into a plurality of blocks;
calculating a correlation between a first block in a first frame of the video data with each of a number of neighboring blocks that surround the first block in a subsequent frame of the video data;
identifying the neighboring block having the highest correlation with the first block in the first frame of the video data;
determining a set of motion vectors corresponding to the identified neighboring block to identify, for the subsequent frame of the video data, the change in the field of view of the camera;
creating a new frame of geographical indicators based on the first frame and the set of motion vectors; and
superimposing the new frame on the subsequent frame of the video data.

2. The mobile computing device of claim 1, wherein the geographic indicators comprise textual data.

3. The mobile computing device of claim 1, wherein execution of the instructions to superimpose the geographic indicators causes the mobile computing device to display distinguishing indicia which distinguishes at least one geographic element corresponding to a first indicator of the geographic indicators from another geographic element corresponding to a second indicator of the geographic indicators.

4. The mobile computing device of claim 3, wherein the distinguishing indicia comprises one or more of a distinguishing color, a distinguishing contrast or brightness, or a blinking indicator.

5. The mobile computing device of claim 1, further comprising a telephony transceiver for telephony communication and an operating system to store personal information management applications and to synchronize personal information management data with a remote server.

6. The mobile computing device of claim 1, wherein the position determination circuit comprises a global positioning system receiver.

7. The mobile computing device of claim 1, wherein the geographic indicators each comprise at least one of a name, an address, location information, or coordinates of a corresponding geographic element, and wherein the geographic elements include one or more buildings, streets, points of interest, waypoints, bodies of water, bridges, sculptures, monuments, parks, or paths.

8. A method for operating a mobile computing device, the method performed by one or more processors of the mobile computing device and comprising:
- capturing video data through a camera of the mobile computing device;
- presenting the video data on a display of the mobile computing device;
- determining a current position of the mobile computing device and an orientation of the camera;
- identifying geographic elements in the video data;
- based on the current position and the orientation of the camera, determining a field of view of the camera;
- superimposing, on the video data, geographic indicators corresponding to the geographic elements; and
- repositioning the geographical indicators on the video data based on a change in the field of view of the camera by:
  - partitioning each frame of the video data into a plurality of blocks;
  - calculating a correlation between a first block in a first frame of the video data with each of a number of neighboring blocks that surround the first block in a subsequent frame of the video data;
  - identifying the neighboring block having the highest correlation with the first block in the first frame of the video data;
  - determining a set of motion vectors corresponding to the identified neighboring block to identify, for the subsequent frame of the video data, the change in the field of view of the camera;
  - creating a new frame of geographical indicators based on the first frame and the set of motion vectors; and
  - superimposing the new frame on the subsequent frame of the video data.

9. The method of claim 8, wherein the geographic indicators comprise textual data.

10. The method of claim 8, wherein superimposing the geographic indicators includes displaying distinguishing indicia which distinguishes at least one geographic element corresponding to a first indicator of the geographic indicators from another geographic element corresponding to a second indicator of the geographic indicators.

11. The method of claim 10, wherein the distinguishing indicia comprises one or more of a distinguishing color, a distinguishing contrast or brightness, or a blinking indicator.

12. The method of claim 8, wherein the geographic indicators each comprise at least one of a name, an address, location information, or coordinates of a corresponding geographic element, and wherein the geographic elements include one or more buildings, streets, points of interest, waypoints, bodies of water, bridges, sculptures, monuments, parks, or paths.

13. A non-transitory computer readable medium storing instructions that, when executed by one or more processors of a mobile computing device, cause the mobile computing device to:
- capture video data through a camera of the mobile computing device;
- present the video data on a display of the mobile computing device;
- determine a current position of the mobile computing device and an orientation of the camera;
- identify geographic elements in the video data;
- based on the current position and the orientation of the camera, determine a field of view of the camera;
- superimpose, on the video data, geographic indicators corresponding to the geographic elements; and
- reposition the geographical indicators on the video data based on a change in the field of view of the camera by:
  - partitioning each frame of the video data into a plurality of blocks;
  - calculating a correlation between a first block in a first frame of the video data with each of a number of neighboring blocks that surround the first block in a subsequent frame of the video data;
  - identifying the neighboring block having the highest correlation with the first block in the first frame of the video data;
  - determining a set of motion vectors corresponding to the identified neighboring block to identify, for the subsequent frame of the video data, the change in the field of view of the camera;
  - creating a new frame of geographical indicators based on the first frame and the set of motion vectors; and
  - superimposing the new frame on the subsequent frame of the video data.

14. The non-transitory computer readable medium of claim 13, wherein the geographic indicators comprise textual data.

15. The non-transitory computer readable medium of claim 13, wherein execution of the instructions to superimpose the geographic indicators causes the mobile computing device to display distinguishing indicia which distinguishes at least one geographic element corresponding to a first indicator of the geographic indicators from another geographic element corresponding to a second indicator of the geographic indicators.

16. The non-transitory computer readable medium of claim 15, wherein the distinguishing indicia comprises one or more of a distinguishing color, a distinguishing contrast or brightness, or a blinking indicator.

17. The non-transitory computer readable medium of claim 13, wherein the geographic indicators each comprise at least one of a name, an address, location information, or coordinates of a corresponding geographic element, and wherein the geographic elements include one or more buildings streets, points of interest, waypoints, bodies of water, bridges, sculptures, monuments, parks, or paths.

* * * * *